(12) United States Patent
Smith

(10) Patent No.: US 8,615,798 B2
(45) Date of Patent: Dec. 24, 2013

(54) OPTIMIZING A DATA DEDUPLICATION SYSTEM USING CLIENT AUTHENTICATION INFORMATION

(75) Inventor: Mark A. Smith, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 1501 days.

(21) Appl. No.: 11/772,066

(22) Filed: Jun. 29, 2007

(65) Prior Publication Data

US 2009/0007261 A1 Jan. 1, 2009

(51) Int. Cl.
*H04L 9/30* (2006.01)
*G06F 15/16* (2006.01)
*G06F 7/00* (2006.01)

(52) U.S. Cl.
USPC . 726/21; 705/50; 707/999.006; 707/999.004; 707/999.01; 707/999.2; 709/206; 711/170

(58) Field of Classification Search
USPC .......................................................... 726/21
See application file for complete search history.

(56) References Cited

U.S. PATENT DOCUMENTS

| 5,732,265 | A * | 3/1998 | Dewitt et al. ........................ 1/1 |
| 6,931,549 | B1 * | 8/2005 | Ananda ........................... 726/26 |
| 7,146,499 | B2 * | 12/2006 | Yellepeddy ..................... 713/165 |
| 7,272,613 | B2 * | 9/2007 | Sim et al. ........................ 709/223 |
| 7,424,514 | B2 * | 9/2008 | Noble et al. .................... 709/205 |
| 7,539,867 | B2 * | 5/2009 | Bolosky et al. ................. 713/175 |
| 7,814,149 | B1 * | 10/2010 | Stringham ...................... 709/203 |
| 8,285,964 | B2 * | 10/2012 | Prahlad et al. ................. 711/170 |
| 2001/0037323 | A1 * | 11/2001 | Moulton et al. .................. 707/1 |
| 2002/0169934 | A1 | 11/2002 | Krapp et al. |
| 2003/0105716 | A1 * | 6/2003 | Sutton et al. ..................... 705/50 |
| 2004/0148306 | A1 | 7/2004 | Moulton et al. |
| 2005/0131939 | A1 | 6/2005 | Douglis et al. |
| 2006/0212465 | A1 | 9/2006 | Fish et al. |
| 2006/0253440 | A1 | 11/2006 | Reed et al. |
| 2006/0259587 | A1 * | 11/2006 | Ackerman et al. ............. 709/219 |
| 2006/0282457 | A1 | 12/2006 | Williams |
| 2007/0067332 | A1 * | 3/2007 | Gallagher et al. ............. 707/102 |
| 2007/0168657 | A1 * | 7/2007 | Carro ............................ 713/156 |
| 2008/0005141 | A1 * | 1/2008 | Zheng et al. .................. 707/101 |
| 2008/0288482 | A1 * | 11/2008 | Chaudhuri et al. ............... 707/5 |
| 2009/0276467 | A1 * | 11/2009 | Scholtes et al. ............... 707/200 |

OTHER PUBLICATIONS

Kotla, R., et al, "SafeStore: A Durable and Practical Storage System", 2007, USENIX Annual USENIX Assoc. Technical Conf., entire document, http://www.cs.utexas.edu/~lorenzo/papers/p129-kotla.pdf.*
Title: "Alternatives for Detecting Redundancy in Storage Systems Data" Author: Policroniades, C.; Pratt, I. Date: 2004 Source: https://www.usenix.org/events/usenix04/tech/general/full_papers/policroniades/policroniades_html/.

(Continued)

*Primary Examiner* — Edan Orgad
*Assistant Examiner* — Ronald Baum
(74) *Attorney, Agent, or Firm* — Leonard Guzman; Mohammed Kashef

(57) ABSTRACT

The present invention provides a method and system of receiving data in a data store in a server computer system. In an exemplary embodiment, the method and system include (1) receiving client authentication information of a client computer system, (2) receiving a data signature of the data from the client computer system, and (3) attempting to locate in the data store at least one data chunk with a stored data signature equal to the received data signature.

8 Claims, 21 Drawing Sheets

(56) References Cited

OTHER PUBLICATIONS

Title: Value Numbering Author: Briggs et al. Date: Jun. 1997 Source: Software-Practice and Experience—vol. 27, No. 6, p. 701-2.

Title: Taper: tieried approach for eliminating redundancy in replica synchronization Author: Jain et al Date:Dec. 2005 Source: 4th USENIX Conference on file and storage technologies p. 281-94.

Title: A generic conversion with optimal redundancy Author: Yang et al. Date:Feb. 2005 Source: Topics in Cryptology-ct-rsa 2005. The cryptographers track at the rsa conference 2005. proceedings.

Title: Redundancy elimination within large collections of files Author: Douglis et al. Date: 2004 Source: Proceedings of General Track 2004 USENIX Annual Technical Conference p. 59-72.

* cited by examiner

OPTIMIZING A DATA DEDUPLICATION SYSTEM USING CLIENT AUTHENTICATION INFORMATION

BACKGROUND OF THE INVENTION

A computer system typically includes a computer filesystem. A server computer system can receive data from at least one client computer system.

Need to Perform Data De-Duplication

Computer systems (e.g. server computer systems) need the ability to perform efficient data de-duplication on data. Because of the proliferation of large amounts of data in computer storage systems, the requirements of the computer hardware needed to store such amounts of data are often difficult to meet for many reasons. For example, the amount of physical space needed to house such computer hardware may be difficult to obtain. Also, the amount of energy used to power such computer hardware, as well as the cost of the hardware, may be difficult to meet. Thus, there is a need to reduce the amount of data stored on computer systems while maintaining consistent data stores in the computer systems, respectively.

Prior Art Systems

In file systems and large collections of files that have provisions for data de-duplication, the common method of identifying duplicate data is by cataloging a relationship between a piece of data (often a file) with its unique data signature (often a data signature of that data). As shown in prior art FIG. 1, a typical prior art system (1) catalogues a relationship between a piece of data with its unique data signature, (2) consults the catalog when data is added to the system, and (3) uses that information to possibly eliminate duplicate data pieces. It can also be consulted by clients at data transmission time in order to eliminate duplicate data transmissions to the collection of files.

Creating this catalog is very expensive, because a data signature must be calculate for each piece of data, and the file system must perform this calculating. Even though clients, in many cases, compute the data signature of data before they send it (for the possibility of obviating the send), the server cannot trust the new data signatures (not already in the server's catalog) that the client has produced for as-of-yet non-redundant data. The file system server cannot allow these client-produced data signatures to be placed in its permanent catalog because malicious clients could corrupt the catalog and cause other clients to corrupt their files by fooling the server into allowing other clients to use data which does not match its data signature.

The server is forced to verify the data signature after the client sends the non-redundant data. When large amounts of data are being sent to the server, such as during a backup, this can cause the server to become slow because it must re-calculate the data signatures of that data to verify the correctness of the client-produced data signatures.

Therefore, a method and system of data in a data store in a server computer system, is needed.

SUMMARY OF THE INVENTION

The present invention provides a method and system of receiving data in a data store in a server computer system. In an exemplary embodiment, the method and system include (1) receiving client authentication information of a client computer system, (2) receiving a data signature of the data from the client computer system, and (3) attempting to locate in the data store at least one data chunk with a stored data signature equal to the received data signature.

In an exemplary embodiment, the method and system further include, if the data chunk is not located, (a) indicating what information needs to be sent to the data store, (b) accepting the indicated information, and (c) storing the received information. In an exemplary embodiment, if the data chunk is not located and if the server computer system is stateless, the indicating includes indicating that the data, the data signature of the data, and the client authentication information of the client computer system needs to be sent to the data store. In an exemplary embodiment, if the data chunk is not located and if the server computer system is stateless, the accepting includes accepting the indicated data, the indicated data signature, and the indicated client authentication information from the client computer system. In an exemplary embodiment, if the data chunk is not located and if the server computer system is stateless, the storing includes storing the accepted data, the accepted data signature, and the accepted client authentication information as the guarantor of the accepted data signature.

In an exemplary embodiment, if the data chunk is not located and if the server computer system is stateful, the indicating includes indicating that the data needs to be sent to the data store. In an exemplary embodiment, if the data chunk is not located and if the server computer system is stateful, the accepting includes accepting the storing includes storing the accepted data, the received data signature, and the received client authentication information as the guarantor of the received data signature.

In an exemplary embodiment, the method and system further include, if the data chunk is located and if the stored data signature for the located data chunk is marked as verified, (a) performing de-duplication of the data with the data chunk and (b) indicating that the data does not need to be received from the client computer system. In an exemplary embodiment, the method and system further include, if the data chunk is located and if the received client authentication information is equal to the stored guarantor client authentication information of the stored data signature, (a) performing de-duplication of the data with the data chunk and (b) indicating that the data does not need to be received from the client computer system. In an exemplary embodiment, the method and system further include, if the data chunk is located and if the guarantor represented by the stored guarantor client information of the stored data signature is trusted by the client represented by the received client authentication information, (a) performing de-duplication of the data with the data chunk and (b) indicating that the data does not need to be received from the client computer system.

In an exemplary embodiment, the method and system further include, if the data chunk is located and if the stored data signature for the located data chunk is not marked as verified and if the received client authentication information is not equal to the stored client authentication information of the stored data signature and if the guarantor represented by the stored guarantor client information of the stored data signature is not trusted by the client represented by the received client authentication information, (1) calculating a data signature for the located data chunk and (2) comparing the calculated data signature to the stored data signature.

In a further embodiment, the method and system further include, if the data chunk is located and if the stored data signature for the located data chunk is not marked as verified and if the received client authentication information is not equal to the stored client authentication information of the stored data signature and if the guarantor represented by the stored guarantor client information of the stored data signature is not trusted by the client represented by the received client authentication information and if the calculated data signature is equal to the stored data signature, (a) marking the stored data signature as verified in a catalog of stored data signatures of stored data chunks in the server computer system, (b) performing de-duplication of the data with the data chunk, and (c) indicating that the data does not need to be received from the client computer system.

In a further embodiment, the method and system further include, if the data chunk is located and if the stored data signature for the located data chunk is not marked as verified and if the received client authentication information is not equal to the stored client authentication information of the stored data signature and if the guarantor represented by the stored guarantor client information of the stored data signature is not trusted by the client represented by the received client authentication information and if the calculated data signature is not equal to the stored data signature, (a) replacing the stored data signature with the calculated data signature, (b) marking the calculated data signature as verified in a catalog of stored data signatures of stored data chunks in the server computer system, (c) indicating what information needs to be sent to the data store, (d) accepting the indicated information, and (e) storing the received information. In a specific embodiment, if the server computer system is stateless, the indicating includes indicating that the data, the data signature of the data, and the client authentication information of the client computer system needs to be sent to the data store. In a specific embodiment, if the server computer system is stateless, the accepting includes accepting the indicated data, the indicated data signature, and the indicated client authentication information from the client computer system. In a specific embodiment, if the server computer system is stateless, the storing includes storing the accepted data, the accepted data signature, and the accepted client authentication information as the guarantor of the accepted data signature. In a specific embodiment, if the server computer system is stateful, the indicating includes indicating that the data needs to be sent to the data store. In a specific embodiment, if the server computer system is stateful, the accepting includes accepting the indicated data from the client computer system. In a specific embodiment, if the server computer system is stateful, the storing includes storing the accepted data, the received data signature, and the received client authentication information as the guarantor of the received data signature.

The present invention also provides a computer program product usable with a programmable computer having readable program code embodied therein of receiving data in a data store in a server computer system. In an exemplary embodiment, the computer program product includes (1) computer readable code for receiving client authentication information of a client computer system, (2) computer readable code for receiving a data signature of the data from the client computer system, and (3) computer readable code for attempting to locate in the data store at least one data chunk with a stored data signature equal to the received data signature.

THE FIGURES

DETAILED DESCRIPTION OF THE INVENTION

The present invention provides a method and system of receiving data in a data store in a server computer system. In an exemplary embodiment, the method and system include (1) receiving client authentication information of a client computer system, (2) receiving a data signature of the data from the client computer system, and (3) attempting to locate in the data store at least one data chunk with a stored data signature equal to the received data signature.

Figure 1:
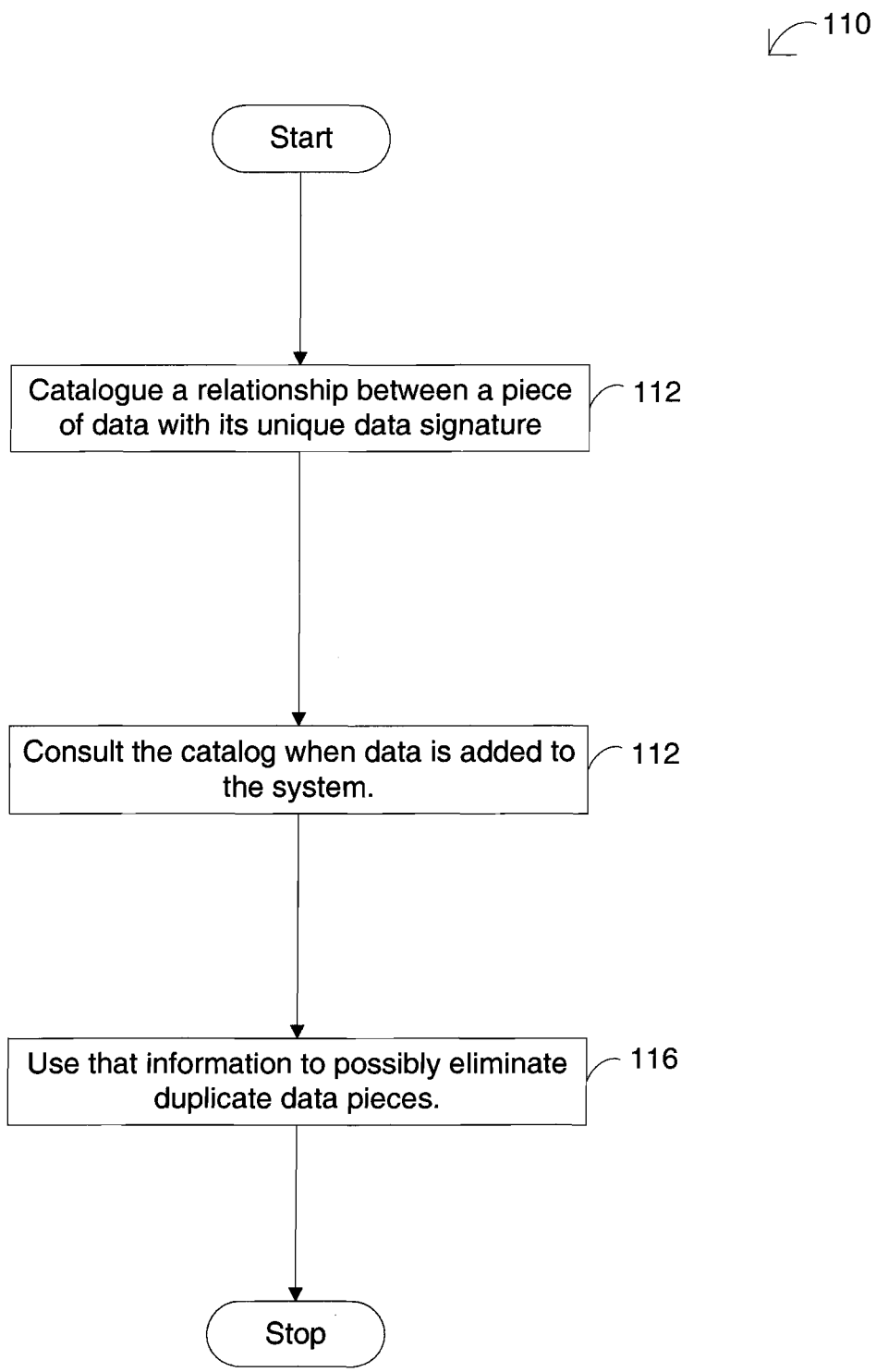
FIG. 1 is a flowchart of a prior art technique.
Figure 2:
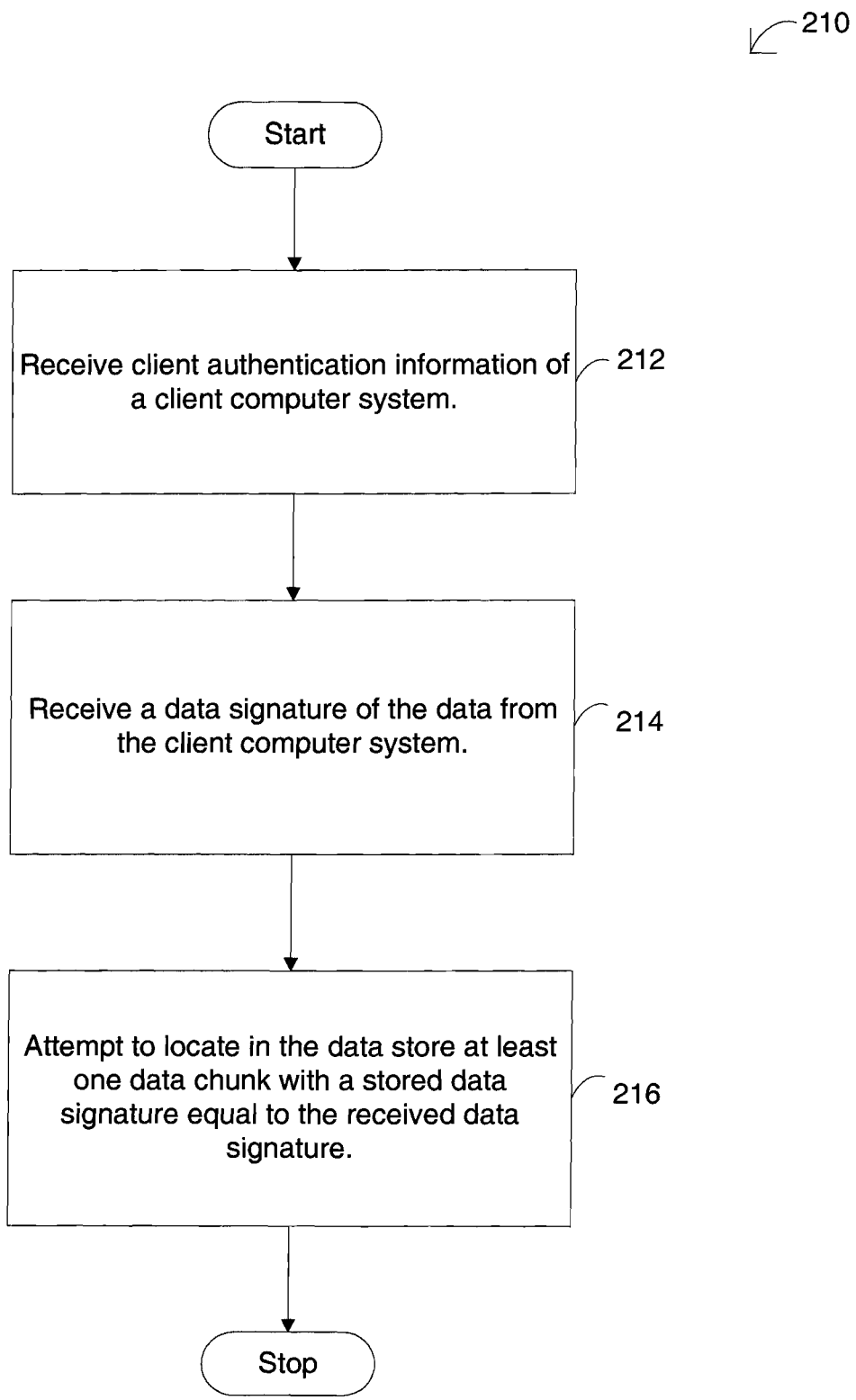
FIG. 2 is a flowchart in accordance with an exemplary embodiment of the present invention.

Referring to FIG. 2, in an exemplary embodiment, the present invention includes a step 212 of receiving client authentication information of a client computer system, a step 214 of receiving a data signature of the data from the client computer system, and a step 216 of attempting to locate in the data store at least one data chunk with a stored data signature equal to the received data signature. When a client computer system desires to add data to the data store, it authenticates to the data store. The client computer system locally computes the data signature(s) of the data it desires to place in the data store and sends that information to the data store. Once the data store receives that information, for each piece of the data signature, the data store attempts to locate in its catalog existing data chunks which have the same signature.

Data Chunk Not Located

Figure 3:
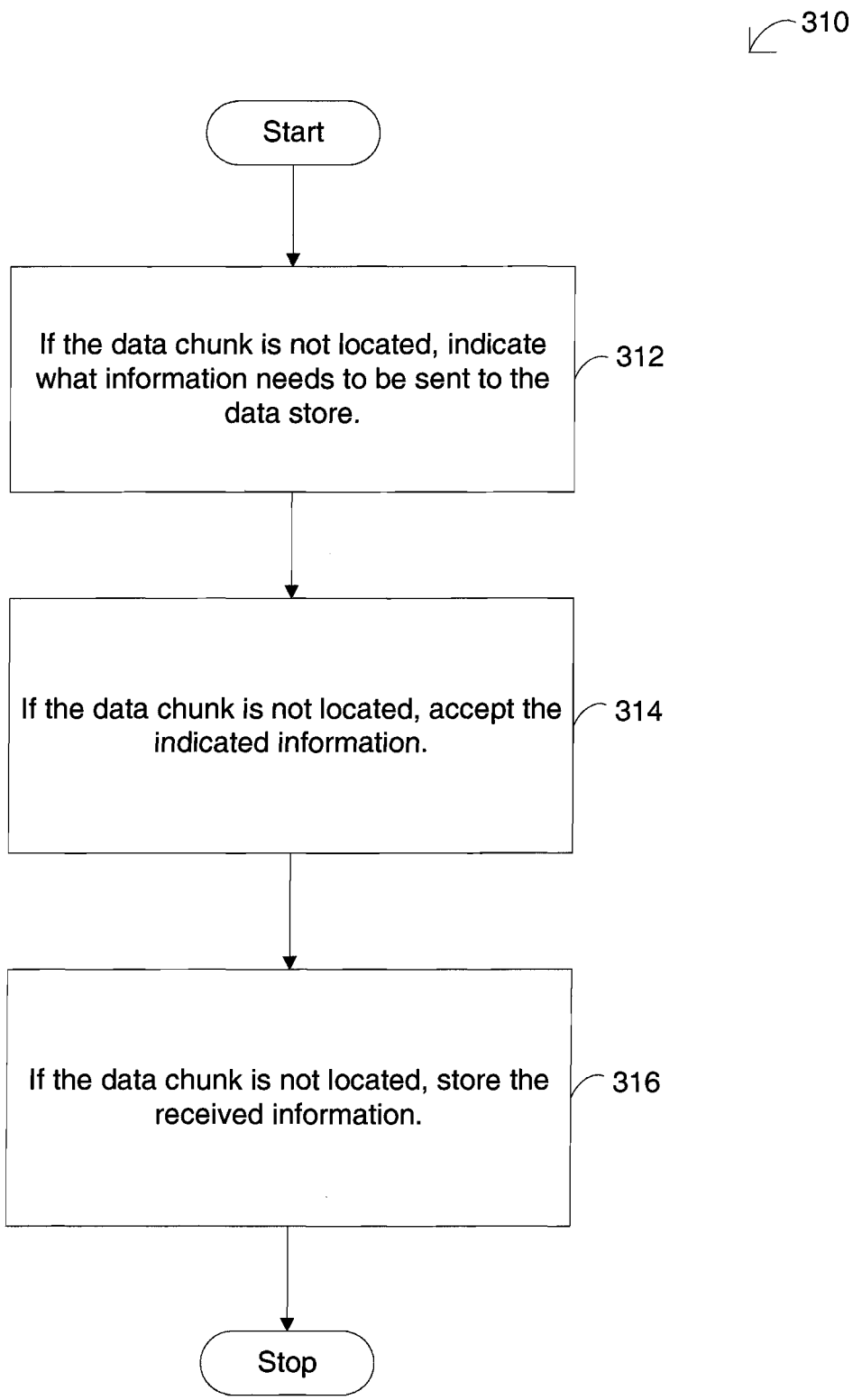
FIG. 3 is a flowchart in accordance with a further embodiment of the present invention.

Referring to FIG. 3, in an exemplary embodiment, the present invention further includes a step 312 of, if the data chunk is not located, indicating what information needs to be sent to the data store, a step 314 of, if the data chunk is not located, accepting the indicated information, and a step 316 of, if the data chunk is not located, storing the received information. For the chunks that are not located, the present invention responds to the client that the client needs to send the data to the data store and stores a client-produced data signature in the server's data signature catalog along with the sending client's authentification information.

Server Computer System Stateless

Figure 4A:
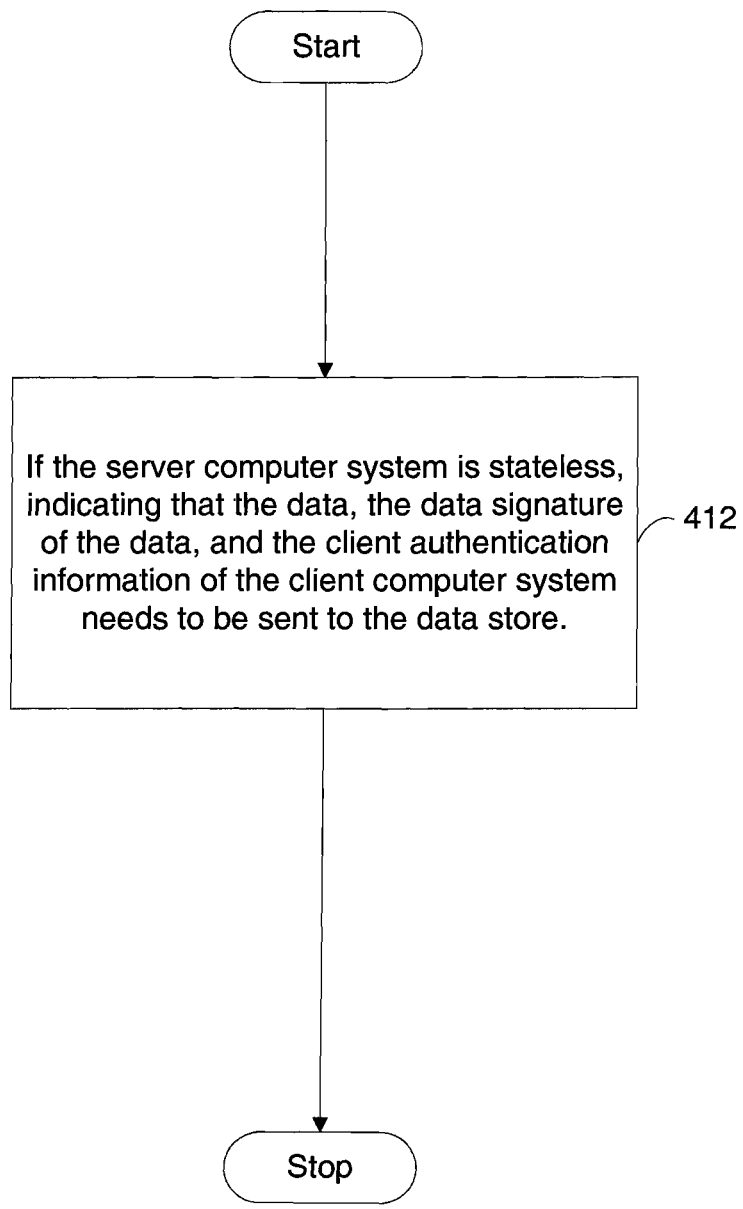
FIG. 4A is a flowchart of the indicating step in accordance with an exemplary embodiment of the present invention.

Referring to FIG. 4A, in an exemplary embodiment, indicating step 312 includes a step 412 of, if the server computer system is stateless, indicating that the data, the data signature of the data, and the client authentication information of the client computer system needs to be sent to the data store. In a stateless server computer system, the data, the data signature, and the client authentication information is sent from the client.

Figure 4B:
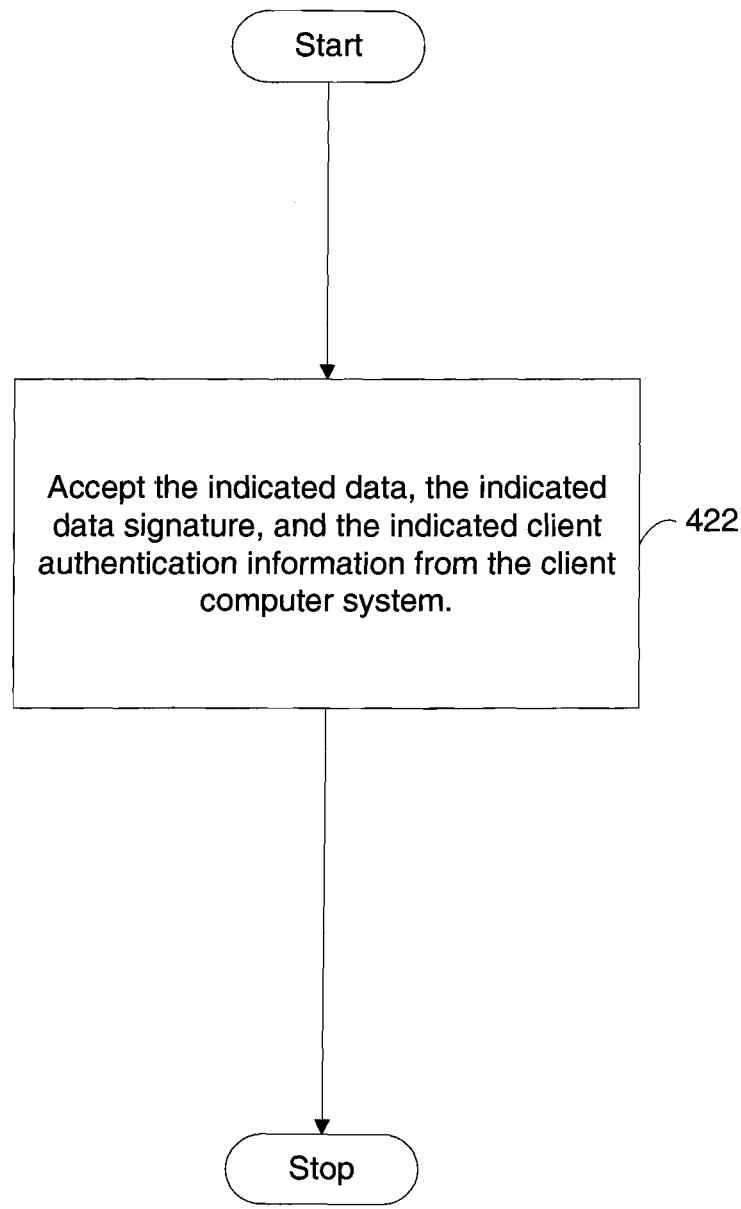
FIG. 4B is a flowchart of the accepting step in accordance with an exemplary embodiment of the present invention.

Referring to FIG. 4B, in an exemplary embodiment, accepting step 314 includes a step 422 of accepting the indicated data, the indicated data signature, and the indicated client authentication information from the client computer system.

Figure 4C:
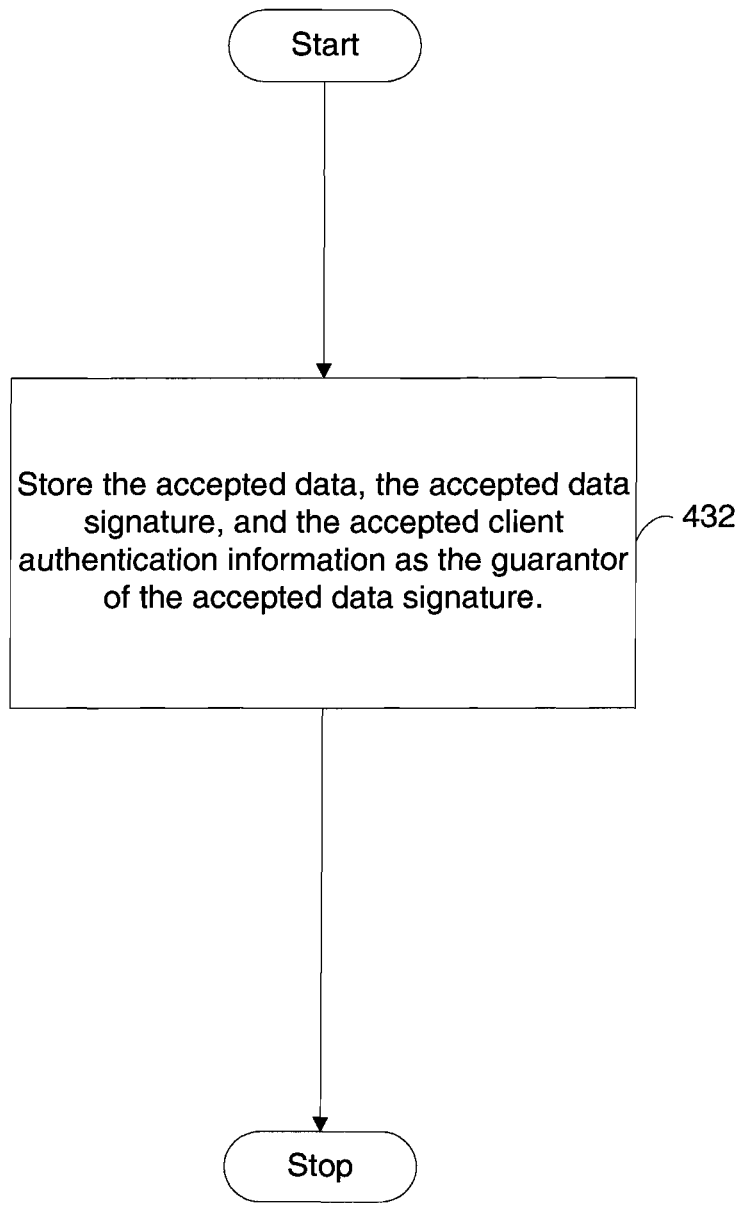
FIG. 4C is a flowchart of the storing step in accordance with an exemplary embodiment of the present invention.

Referring to FIG. 4C, in an exemplary embodiment, storing step 316 includes a step 432 of storing the accepted data, the accepted data signature, and the accepted client authentication information as the guarantor of the accepted data signature.

Server Computer System Stateful

Figure 5A:
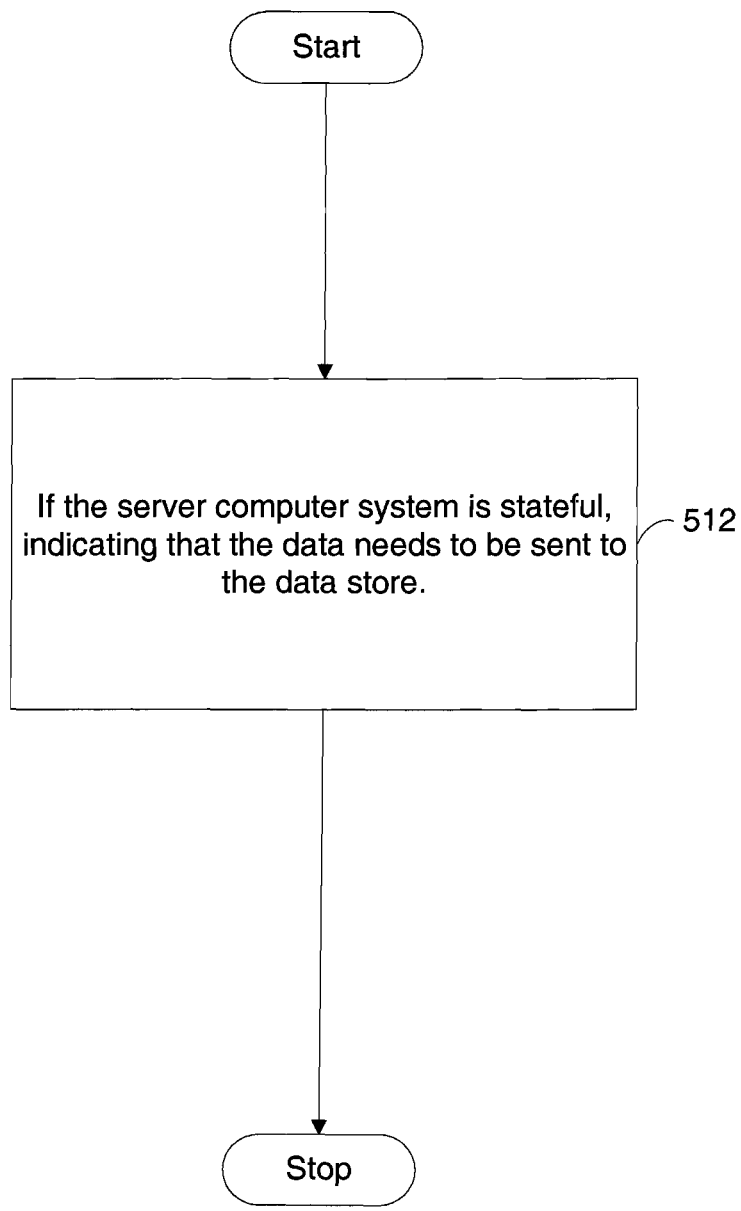
FIG. 5A is a flowchart of the indicating step in accordance with an exemplary embodiment of the present invention.

Referring to FIG. 5A, in an exemplary embodiment, indicating step 312 includes a step 512 of, if the server computer system is stateful, indicating that the data needs to be sent to the data store. In a stateful server computer system, only the data needs to be sent, while the previously received data signature and client authentication information can be used.

Figure 5B:
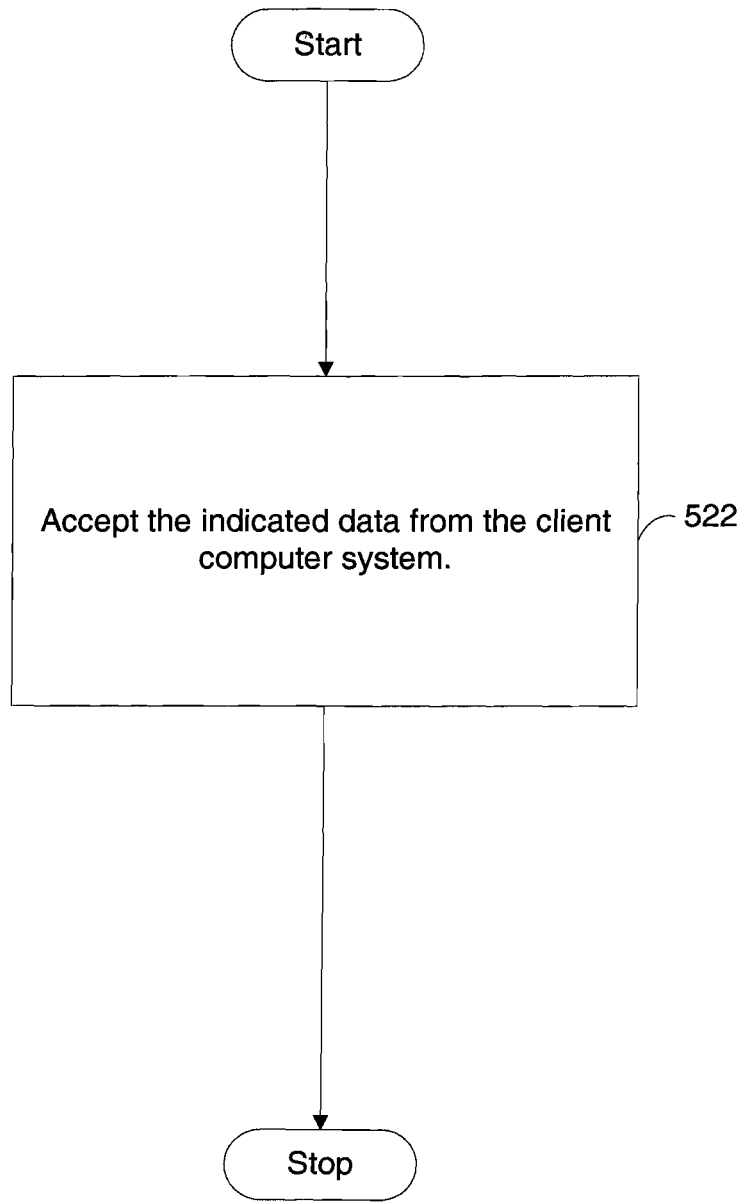
FIG. 5B is a flowchart of the accepting step in accordance with an exemplary embodiment of the present invention.

Referring to FIG. 5B, in an exemplary embodiment, accepting step 314 includes a step 522 of accepting the indicated data from the client computer system.

Figure 5C:
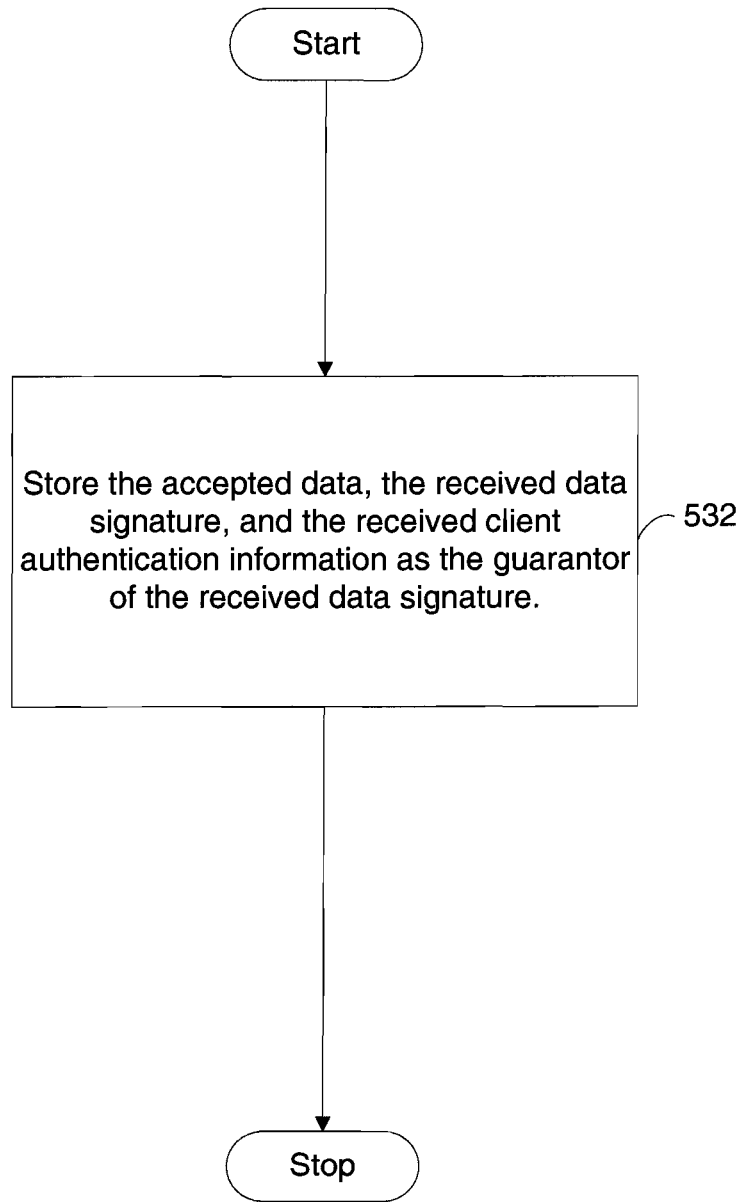
FIG. 5C is a flowchart of the storing step in accordance with an exemplary embodiment of the present invention.

Referring to FIG. 5C, in an exemplary embodiment, storing step 316 includes a step 532 of storing the accepted data, the received data signature, and the received client authentication information as the guarantor of the received data signature.

Data Chunk Located

Data Chunk Verified

Figure 6A:
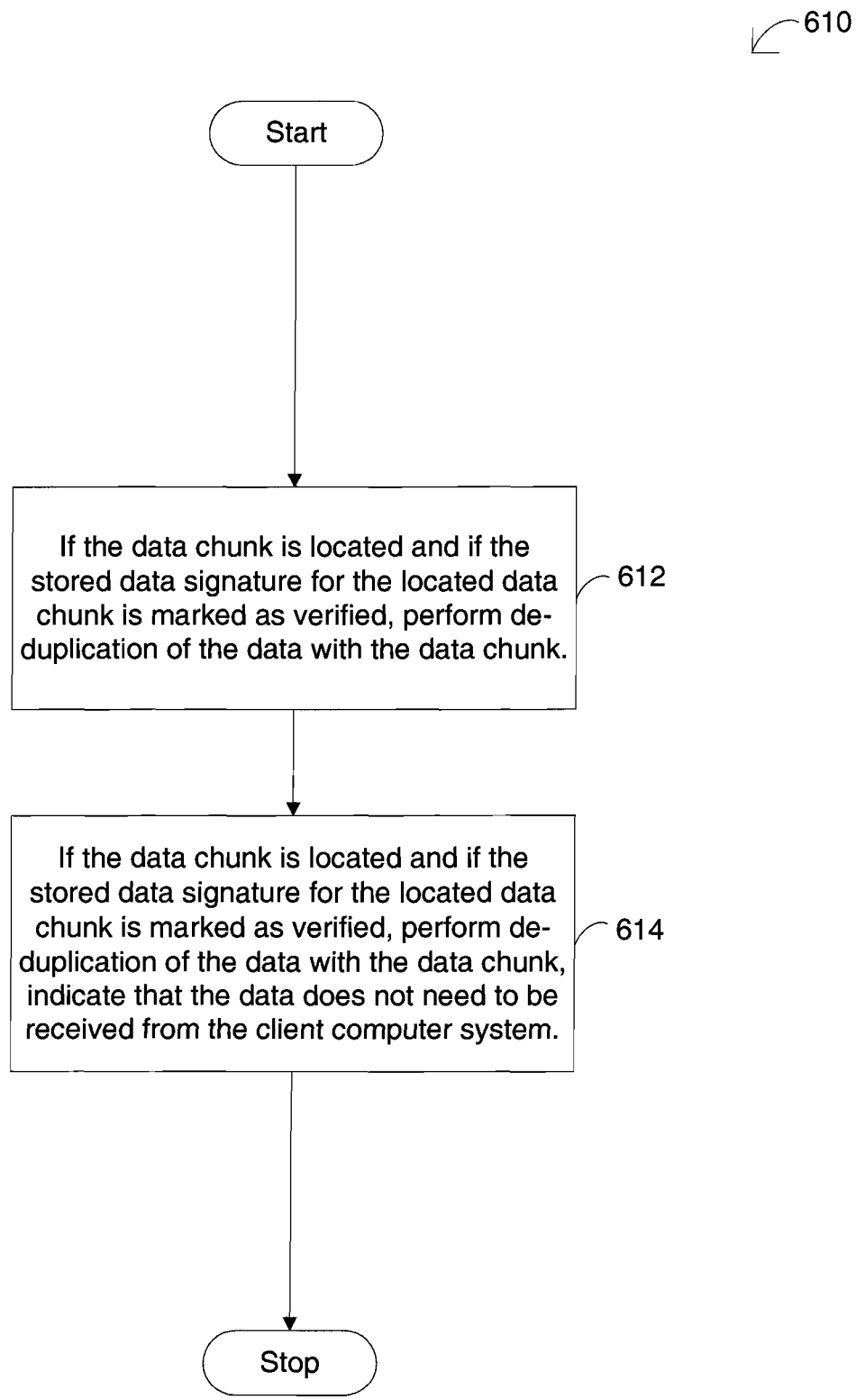
FIG. 6A is a flowchart in accordance with a further embodiment of the present invention.

Referring to FIG. 6A, in an exemplary embodiment, the present invention further includes a step 612 of, if the data chunk is located and if the stored data signature for the located data chunk is marked as verified, performing de-duplication of the data with the data chunk, and a step 614 of, if the data chunk is located and if the stored data signature for the located data chunk is marked as verified, indicating that the data does not need to be received from the client computer system. For the data chunks that are located in the catalog, the present invention checks if the data signature has been previously verified. If so, the present invention performs the data de-duplication with the located data chunk and responds to the client that it does not need to send the data.

Figure 6B:
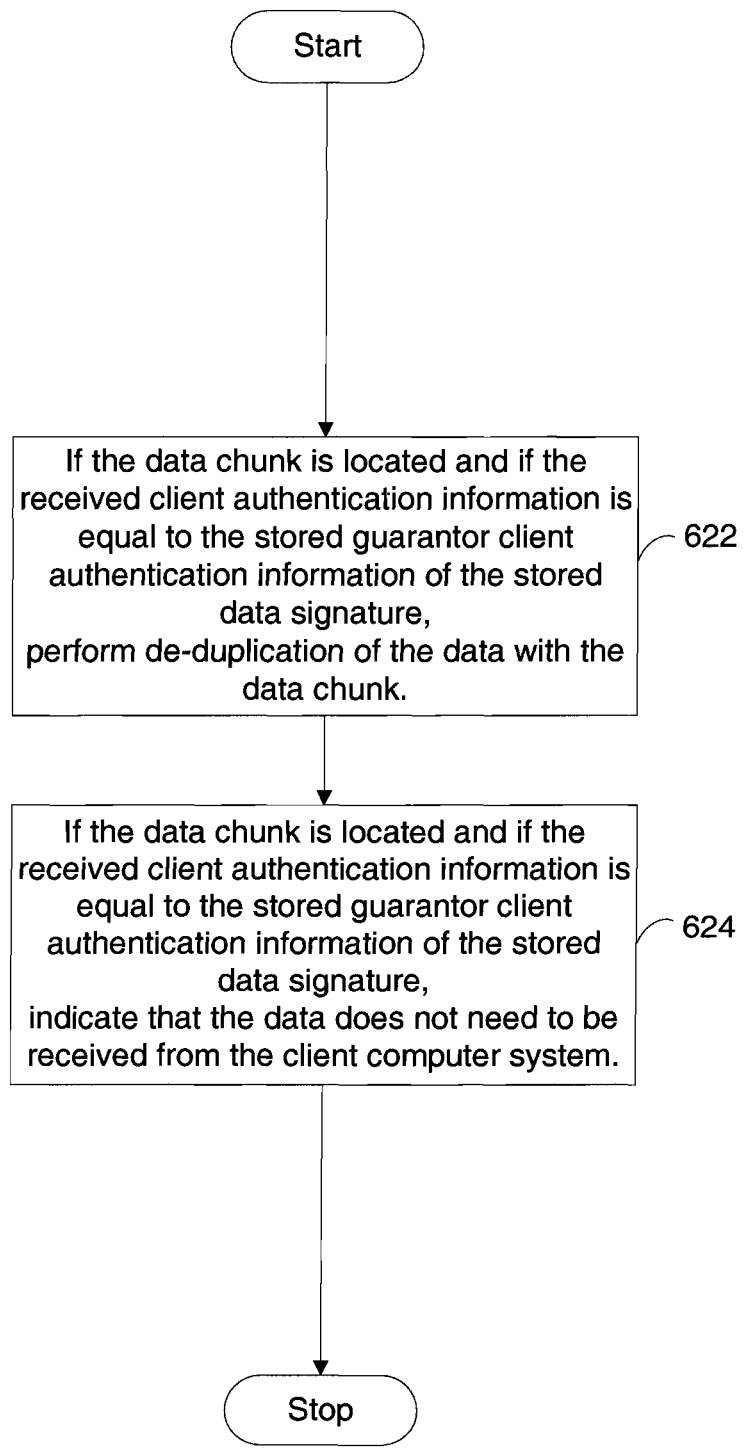
FIG. 6B is a flowchart in accordance with a further embodiment of the present invention.

Received Client Authentication Information Equal to Stored Guarantor Client Authentication Information Referring to FIG. 6B, in an exemplary embodiment, the present invention further includes a step 622 of, if the data chunk is located and if the received client authentication information is equal to the stored guarantor client authentication information of the stored data signature, performing de-duplication of the data with the data chunk, and a step 624 of, if the data chunk is located and if the received client authentication information is equal to the stored guarantor client authentication information of the stored data signature, indicating that the data does not need to be received from the client computer system. Data signatures need to be verified when a different user matches the data signature and wishes to perform data de-duplication. The data signature can be used by the same user for data de-duplication within the user's own collection of files without need for verification. For the data chunks that are located in the catalog, the present invention checks if the requesting client has the same authentication information as the identified chunk. If so, the present invention performs the data de-duplication with the located data chunk and responds to the client that it does not need to send the data.

Guarantor Trusted by Client

Figure 6C:
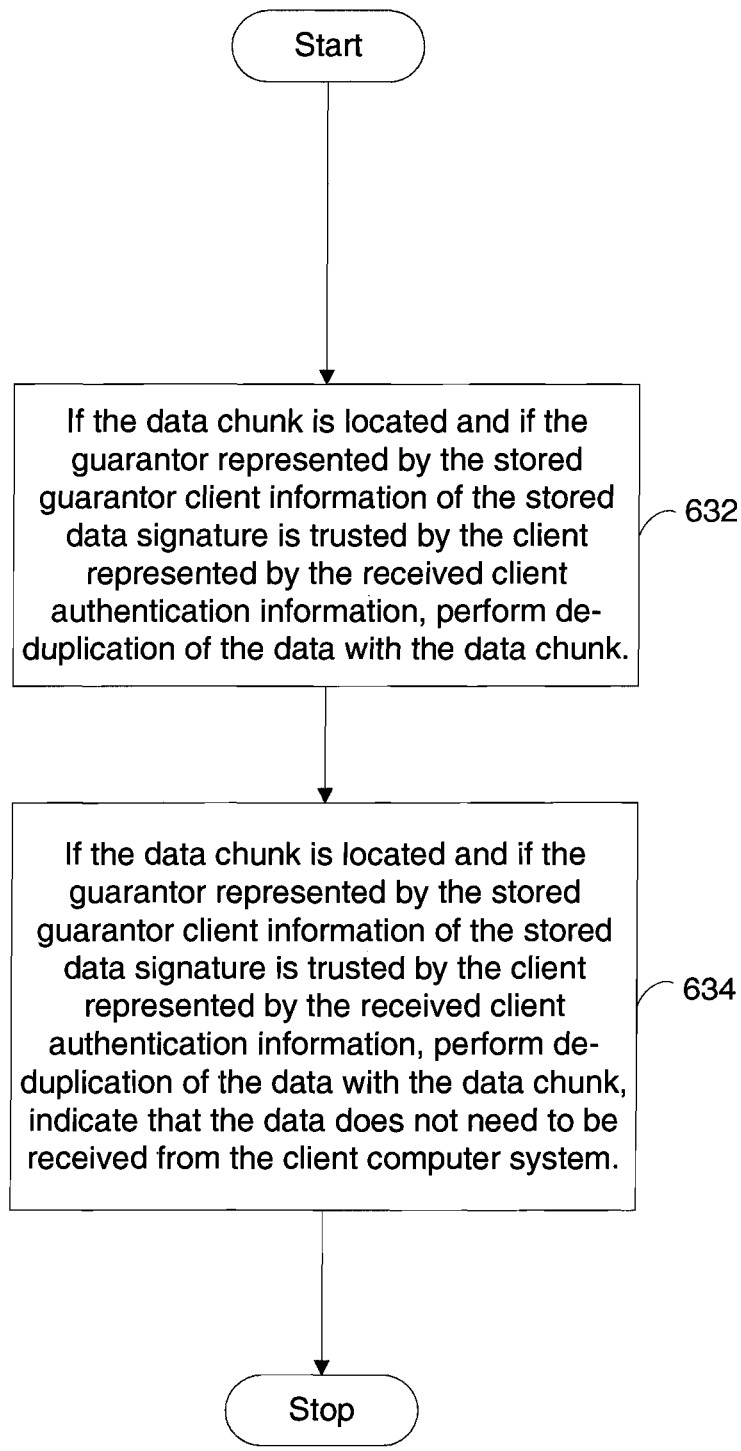
FIG. 6C is a flowchart in accordance with a further embodiment of the present invention.

Referring to FIG. 6C, in an exemplary embodiment, the present invention further includes a step 632 of, if the data chunk is located and if the guarantor represented by the stored guarantor client information of the stored data signature is trusted by the client represented by the received client authentication information, performing de-duplication of the data with the data chunk, and a step 634 of, if the data chunk is located and if the guarantor represented by the stored guarantor client information of the stored data signature is trusted by the client represented by the received client authentication information, indicating that the data does not need to be received from the client computer system.

Figure 7:
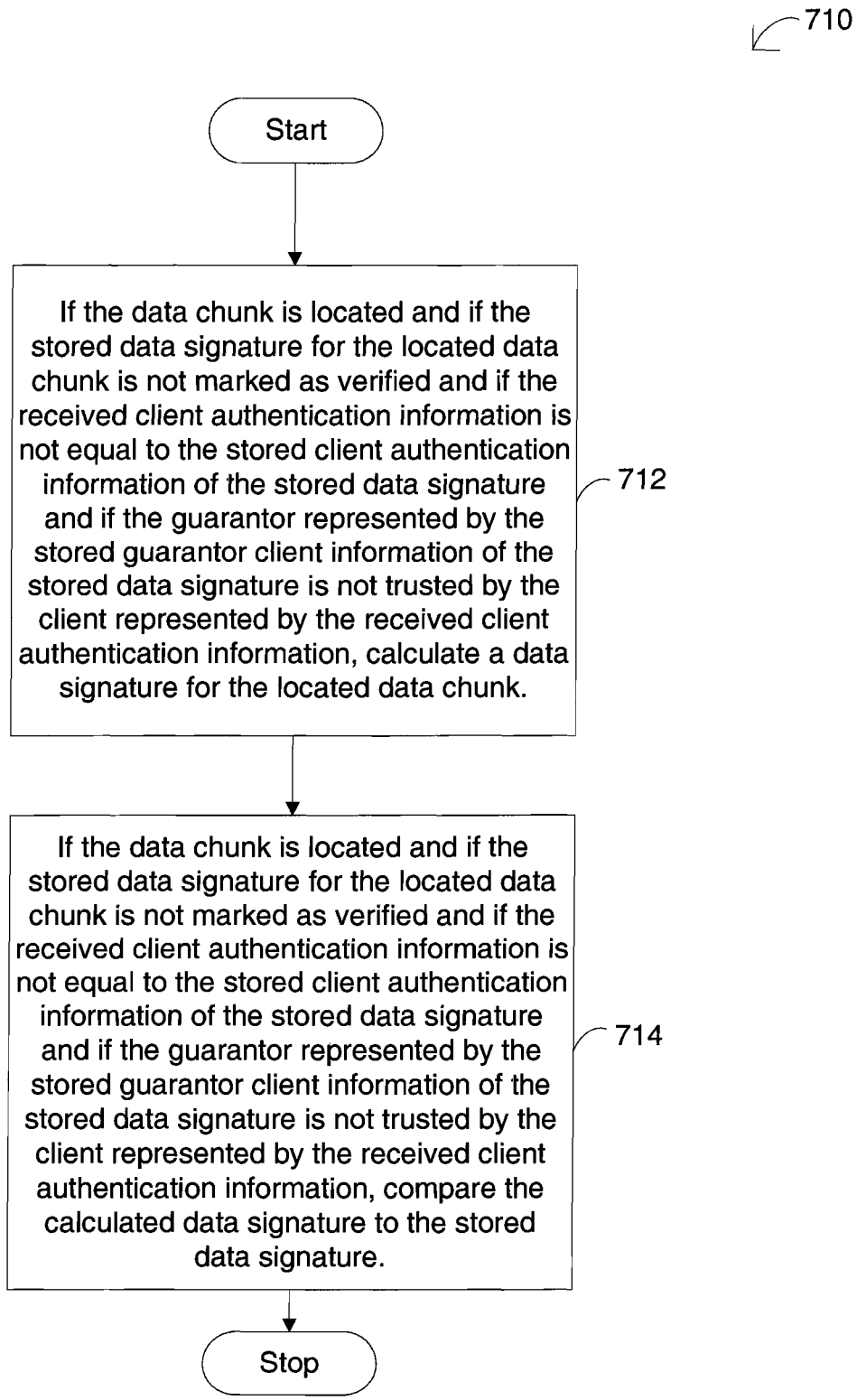
FIG. 7 is a flowchart in accordance with a further embodiment of the present invention.

Data Chunk Not Verified, Received Client Authentication Information Not Equal to Stored Guarantor Client Authentication Information, and Guarantor Not Trusted by Client Referring to FIG. 7, in an exemplary embodiment, the present invention further includes a step 712 of, if the data chunk is located and if the stored data signature for the located data chunk is not marked as verified and if the received client authentication information is not equal to the stored client authentication information of the stored data signature and if the guarantor represented by the stored guarantor client information of the stored data signature is not trusted by the client represented by the received client authentication information, calculating a data signature for the located data chunk, and a step 714 of, if the data chunk is located and if the stored data signature for the located data chunk is not marked as verified and if the received client authentication information is not equal to the stored client authentication information of the stored data signature and if the guarantor represented by the stored guarantor client information of the stored data signature is not trusted by the client represented by the received client authentication information, comparing the calculated data signature to the stored data signature. If the data signature has not been previously verified and it was produced by a different authenticated client, the server computer system verifies the data signature.

Calculated Data Signature Equal to Stored Data Signature

Figure 8:
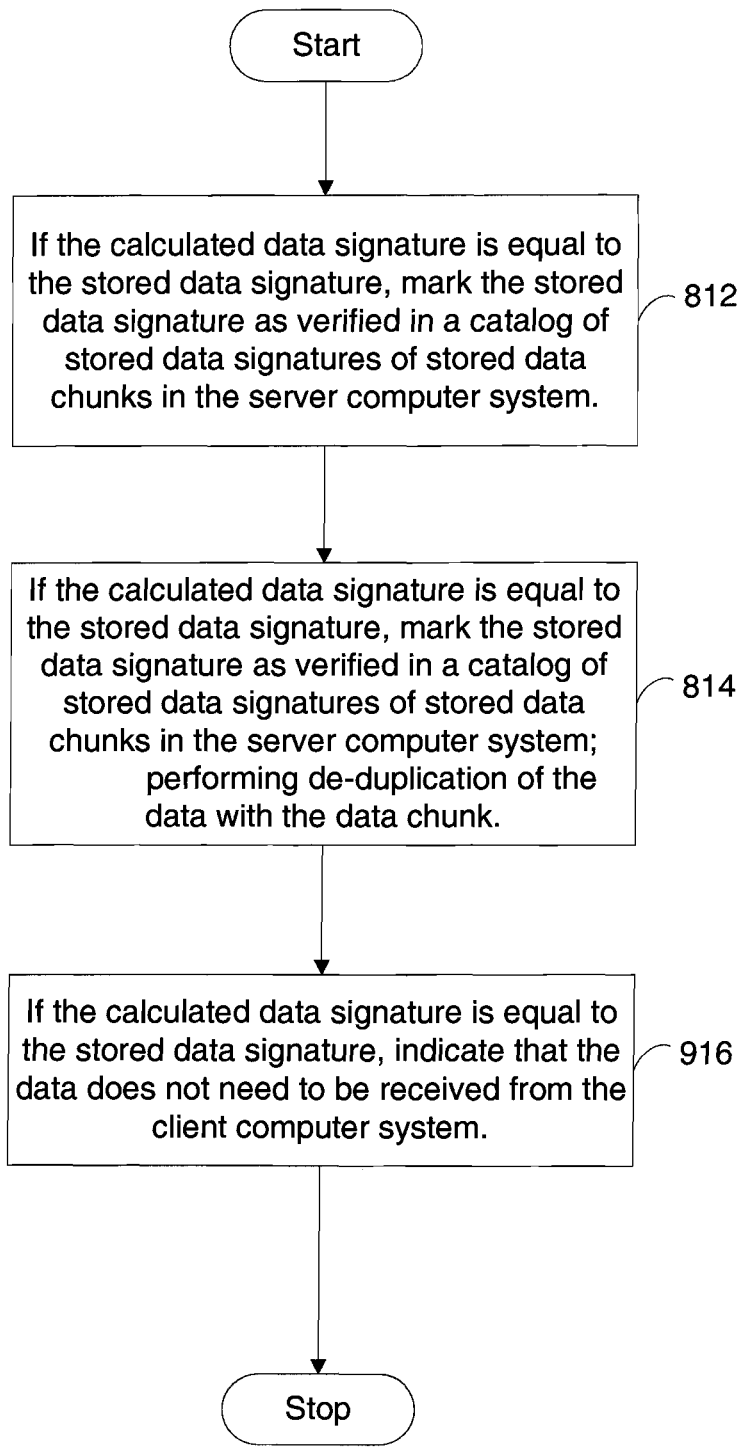
FIG. 8 is a flowchart in accordance with a further embodiment of the present invention.

Referring to FIG. 8, in an exemplary embodiment, the present invention further includes a step 812 of, if the calculated data signature is equal to the stored data signature, marking the stored data signature as verified in a catalog of stored data signatures of stored data chunks in the server computer system, a step 814 of, if the calculated data signature is equal to the stored data signature, performing de-duplication of the data with the data chunk, and a step 816 of, if the calculated data signature is equal to the stored data signature, indicating that the data does not need to be received from the client computer system. If the signature is verified, the server computer system marks the signature as verified in its catalog, performs the data de-duplication with the located data chunk, and responds to the client that the client does not need to send the data.

Calculated Data Signature Not Equal to Stored Data Signature

Figure 9:
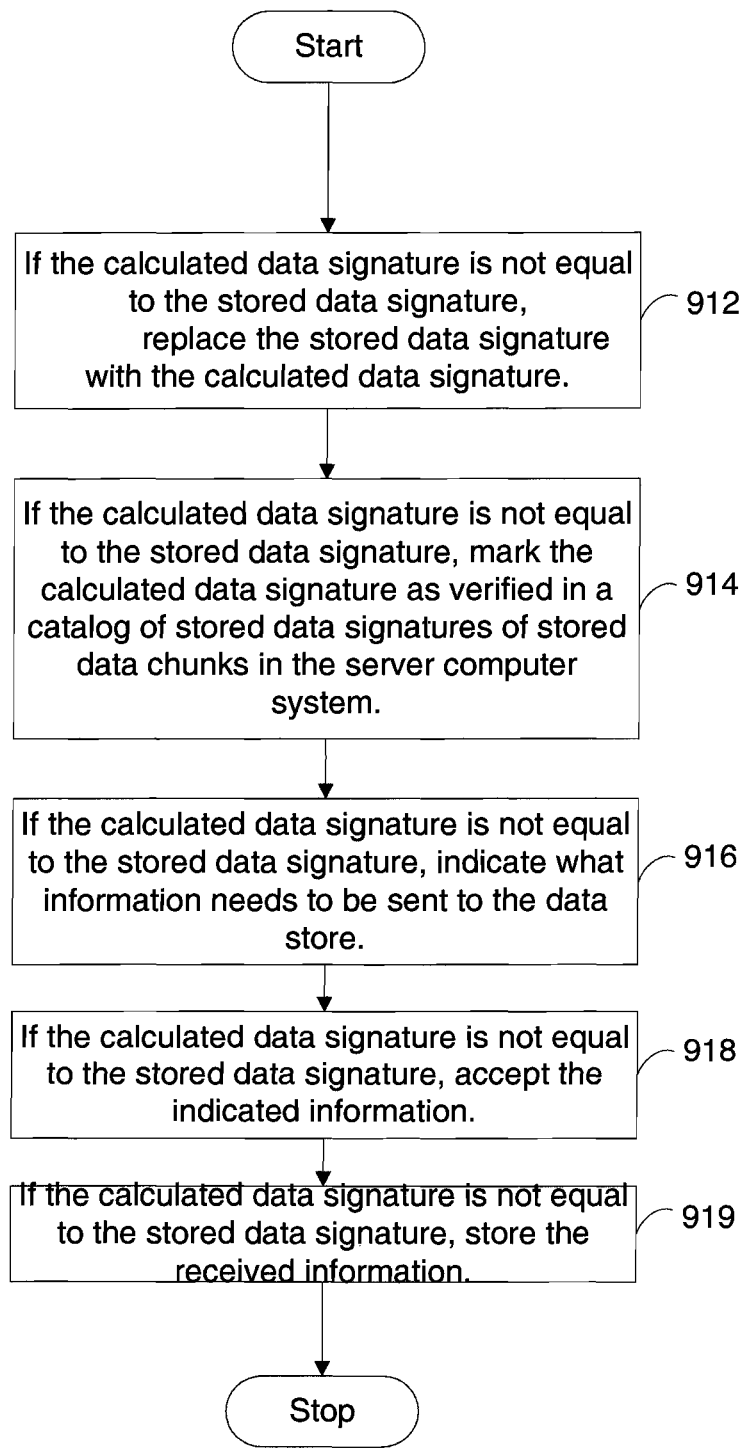
FIG. 9 is a flowchart in accordance with a further embodiment of the present invention.

Referring to FIG. 9, in an exemplary embodiment, the present invention further includes a step 912 of, if the calculated data signature is not equal to the stored data signature, replacing the stored data signature with the calculated data signature, a step 914 of, if the calculated data signature is not equal to the stored data signature, marking the calculated data signature as verified in a catalog of stored data signatures of stored data chunks in the server computer system, a step 916 of, if the calculated data signature is not equal to the stored data signature, indicating what information needs to be sent to the data store, a step 918 of, if the calculated data signature is not equal to the stored data signature, accepting the indicated information, and a step 919 of, if the calculated data signature is not equal to the stored data signature, storing the received information. If the data signature does not verify, the data store replaces the incorrect client-produced data signature with the correct server-produced data signature.

Server Computer System Stateless

Figure 10A:
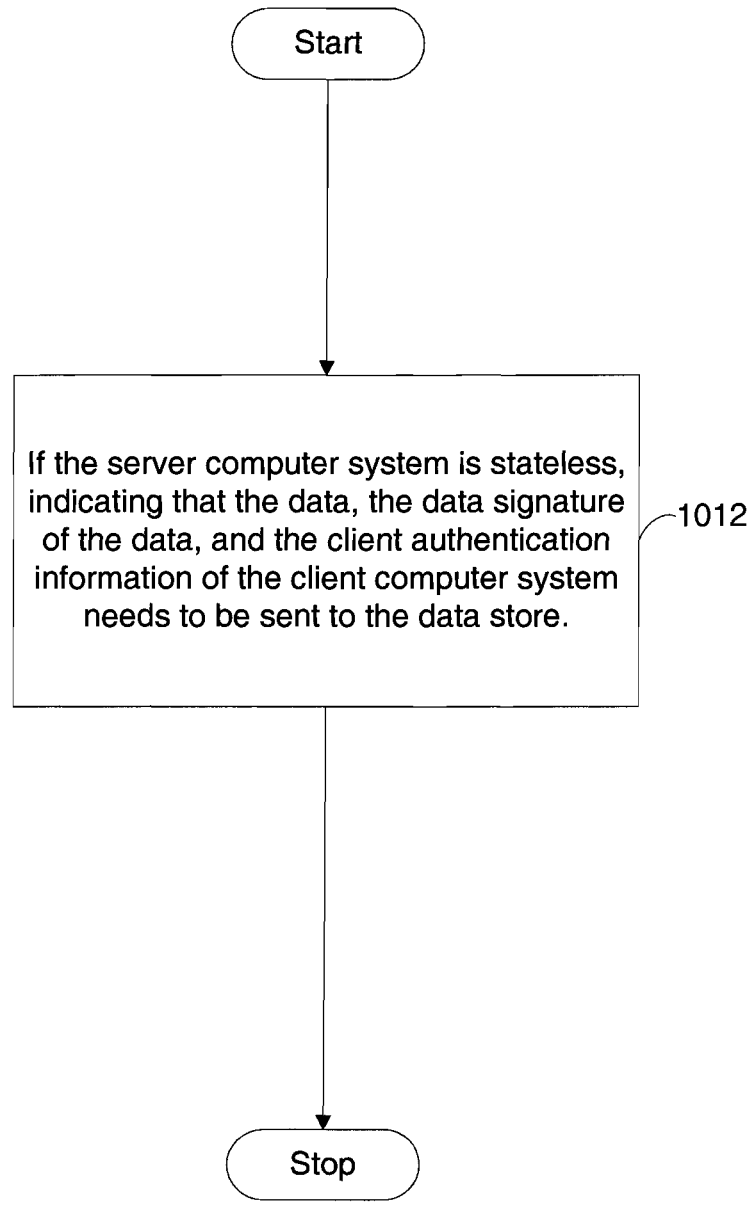
FIG. 10A is a flowchart of the indicating step in accordance with an exemplary embodiment of the present invention.

Referring to FIG. 10A, in an exemplary embodiment, indicating step 916 includes a step 1012 of, if the server computer system is stateless, indicating that the data, the data signature of the data, and the client authentication information of the client computer system needs to be sent to the data store. In a stateless server computer system, the data, the data signature, and the client authentication information is sent from the client.

Figure 10B:
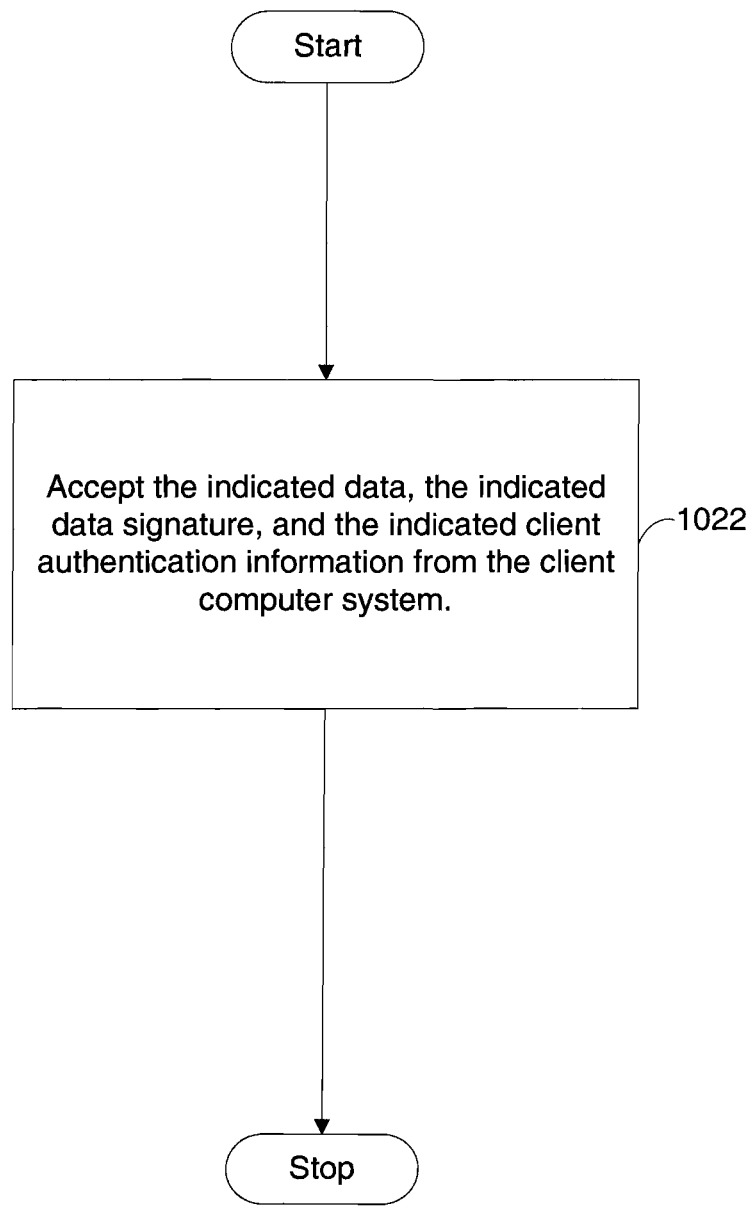
FIG. 10B is a flowchart of the accepting step in accordance with an exemplary embodiment of the present invention.

Referring to FIG. 10B, in an exemplary embodiment, accepting step 918 includes a step 1022 of accepting the indicated data, the indicated data signature, and the indicated client authentication information from the client computer system.

Figure 10C:
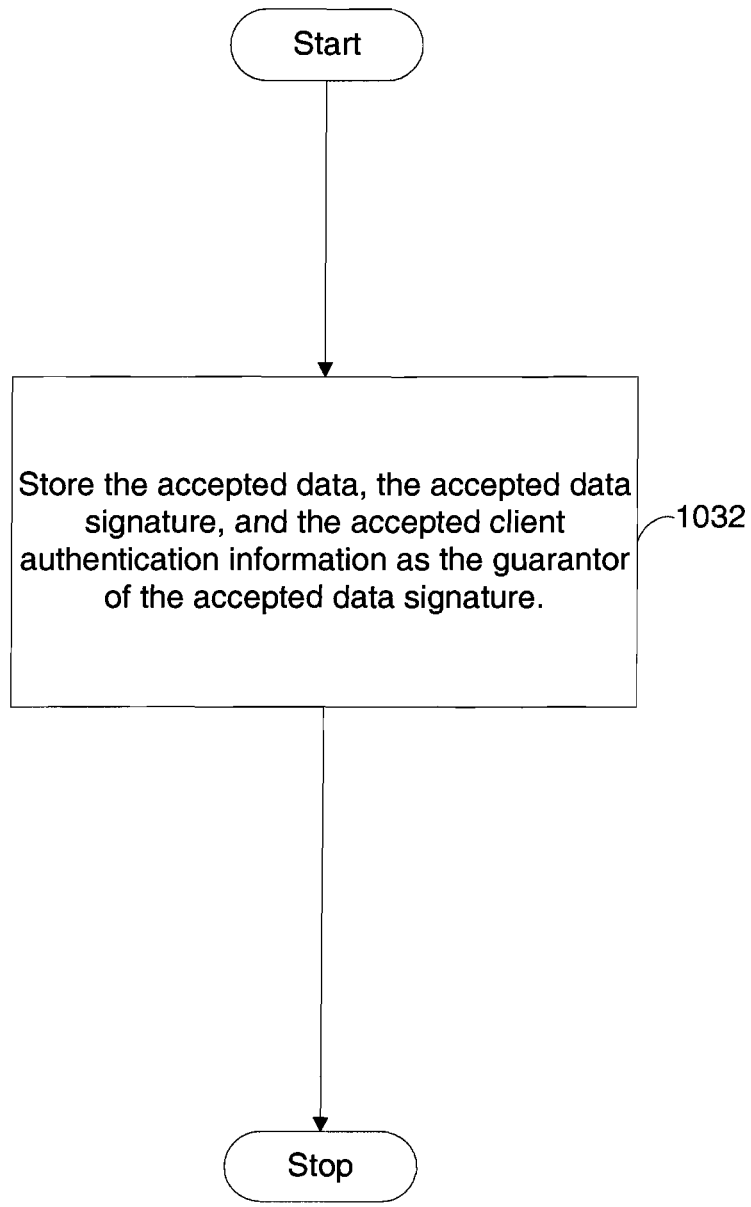
FIG. 10C is a flowchart of the storing step in accordance with an exemplary embodiment of the present invention.

Referring to FIG. 10C, in an exemplary embodiment, storing step 919 includes a step 1032 of storing the accepted data, the accepted data signature, and the accepted client authentication information as the guarantor of the accepted data signature.

Server Computer System Stateful

Figure 11A:
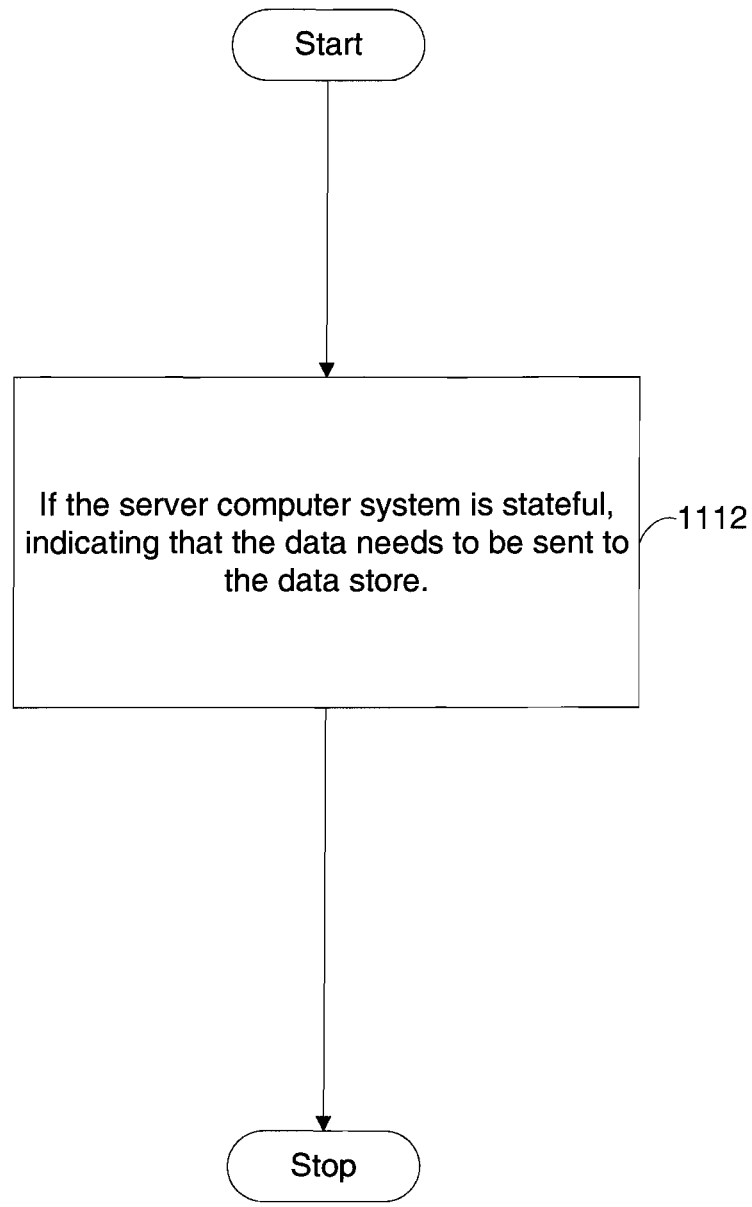
FIG. 11A is a flowchart of the indicating step in accordance with an exemplary embodiment of the present invention.

Referring to FIG. 11A, in an exemplary embodiment, indicating step 916 includes a step 1112 of, if the server computer system is stateful, indicating that the data needs to be sent to the data store. In a stateful server computer system, only the data needs to be sent, while the previously received data signature and client authentication information can be used.

Figure 11B:
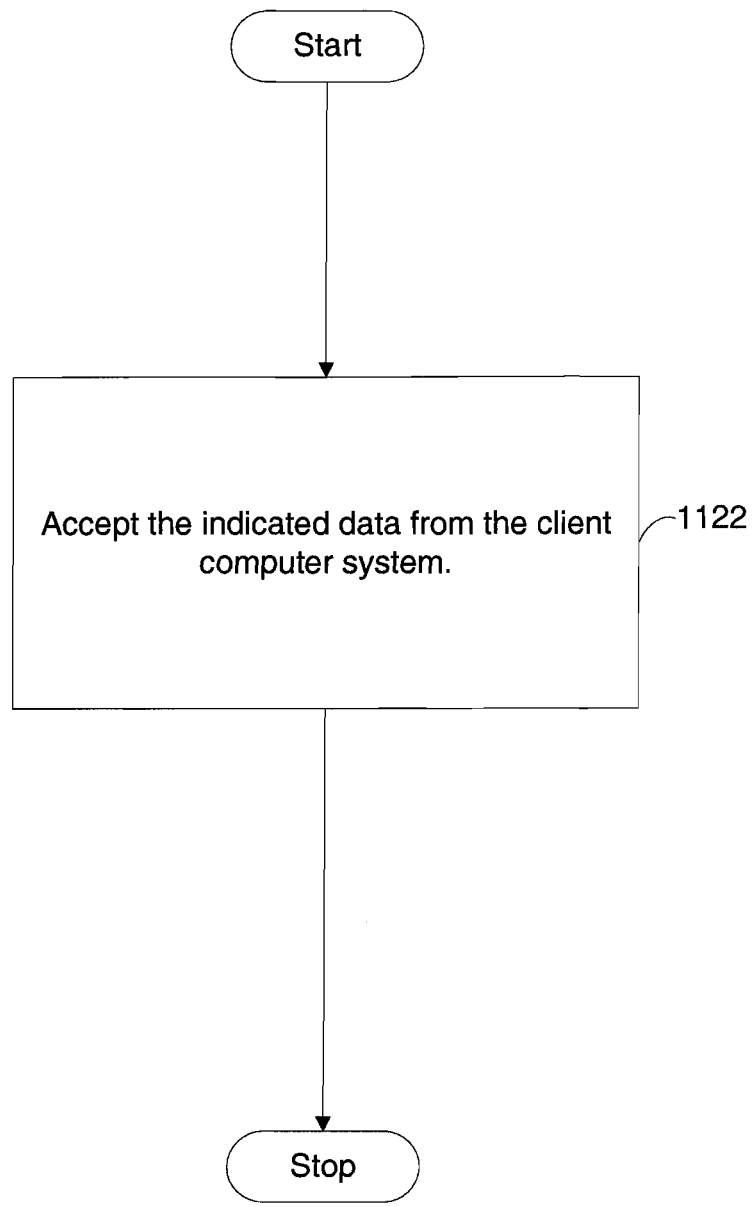
FIG. 11B is a flowchart of the accepting step in accordance with an exemplary embodiment of the present invention.

Referring to FIG. 11B, in an exemplary embodiment, accepting step 918 includes a step 1022 of accepting the indicated data from the client computer system.

Figure 11C:
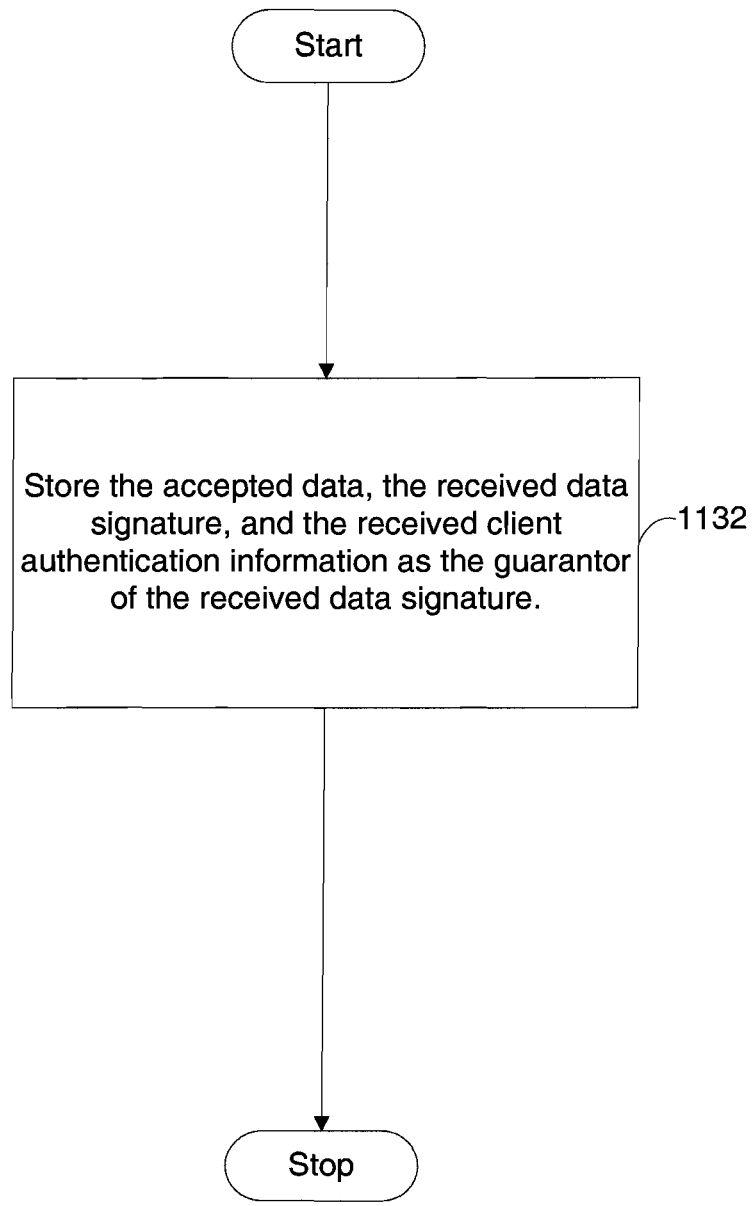
FIG. 11C is a flowchart of the storing step in accordance with an exemplary embodiment of the present invention.

Referring to FIG. 11C, in an exemplary embodiment, storing step 919 includes a step 1032 of storing the accepted data, the received data signature, and the received client authentication information as the guarantor of the received data signature.

General

The present invention can take the form of an entirely hardware embodiment, an entirely software embodiment, or an embodiment containing both hardware and software elements. In an exemplary embodiment, the present invention is implemented in software, which includes but is not limited to firmware, resident software, and microcode.

Furthermore, the present invention can take the form of a computer program product accessible from a computer-usable or computer-readable medium providing program code for use by or in connection with a computer system or any instruction execution system. The computer program product includes the instructions that implement the method of the present invention. A computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

A computer system suitable for storing and/or executing program code includes at least one processor coupled directly or indirectly to memory elements through a system bus. The memory elements include local memory employed during actual execution of the program code, bulk storage, and cache memories that provide temporary storage of at least some program code to reduce the number of times code is retrieved from bulk storage during execution. Input/output (I/O) devices (including but not limited to keyboards, displays, pointing devices, etc.) can be coupled to the computer system either directly or through intervening I/O controllers. Network adapters may also be coupled to the computer system in order to enable the computer system to become coupled to other computer systems or remote printers or storage devices through intervening private or public networks. Modems, cable modems, and Ethernet cards are just a few of the currently available types of network adapters.

Conclusion

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A method for optimizing a data deduplication storage system in a non-staged storage environment using client authentication information, comprising:

receiving, by a data deduplication storage system, authentication information of a host system of a client of said deduplication system;

receiving, by said deduplication system, a data signature from said client, the data signature representing particular data to be received by said deduplication system;

determining whether a data chunk corresponding to the data signature is stored in said deduplication system and whether said deduplication system is stateful or stateless if the data signature is not stored in said deduplication system, wherein the data chunk is stored in said deduplication system if there is a data signature stored being equal in value to the received data signature;

in response to said determining that a data chunk is not stored in said deduplication system for a corresponding data signature received and that said deduplication system is stateless, said deduplication system, notifies said client that the particular data are not stored, receives the particular data from said client, and stores: the particular data, the data signature representing said particular data, and said client authentication information as the guarantor of the data signature;

in response to said determining that a data chunk is not stored in said deduplication system for a corresponding data signature received and that said deduplication system is stateful, said deduplication system, notifies said client that the particular data are not stored, receives the particular data from said client, stores the particular data, and uses previously received data signature representing said particular data and previously received client authentication information as the guarantor of the data signature;

in response to said determining that a data chunk is stored in said deduplication system, said deduplication system reads a guarantor of a stored data signature corresponding to the data chunk stored and determines whether the guarantor is trusted by said client, wherein said deduplication system performs deduplication of said particular data by indicating that said particular data does not need to be received from said client when the guarantor is trusted by said client or calculates and stores a new data signature for the data chunk stored and then marks the new data signature as verified when the guarantor is not trusted by said client; and wherein a guarantor is determined to be trusted by a host system of a client of said deduplication system if the received client authentication information is equal in value to the stored client authentication information, and using the guarantor reduces said deduplication system's verification of client data signatures such that data signatures only need to be verified for a new client of previously stored data.

2. The method of claim 1, wherein the guarantor is determined to be trusted by a client if the stored data signature for the located data chunk is marked as verified.

3. The method of claim 1, wherein the guarantor is determined to be trusted by a client if the guarantor is included in a list of trusted guarantors for the client.

4. The method of claim 1, wherein the guarantor is determined not to be trusted by a client if:
the stored data signature for the located data chunk is not marked as verified,
the received client authentication information is not equal to the stored client authentication information of the stored data signature; and
the guarantor is not included in a list of trusted guarantors for the client.

5. A computer program product for optimizing a data deduplication storage system in a non-staged storage environment using client authentication information, the computer program product comprising a non-transitory computer readable storage medium having computer readable program code embodied therewith, said program code being executable by a data deduplication enabled storage system to:
receive, by a data deduplication storage system, authentication information of said client of said deduplication system;
receive, by said deduplication system, a data signature from said client, the data signature representing particular data to be received by said deduplication system;
determine whether system a data chunk corresponding to the data signature is stored in said deduplication system, wherein the data chunk is stored in said deduplication system if there is a data signature stored being equal in value to the received data signature;

in response to said determine that a data chunk is not stored in said deduplication system for a corresponding data signature received and that said deduplication system is stateless, said deduplication system, notifies said client that the particular data are not stored, receives the particular data from said client, and stores: the particular data, the data signature representing said particular data, and said client authentication information as the guarantor of the data signature;

in response to said determine that a data chunk is not stored in said deduplication system for a corresponding data signature received and that said deduplication system is stateful, said deduplication system, notifies said client that the particular data are not stored, receives the particular data from said client, stores the particular data, and uses previously received data signature representing said particular data and previously received client authentication information as the guarantor of the data signature;

in response to said determine that a data chunk is stored in said deduplication system, said deduplication system reads a guarantor of a stored data signature corresponding to the data chunk stored and determines whether the guarantor is trusted by said client, wherein said deduplication system performs de-duplication of said particular data by indicating that said particular data does not need to be received from said client when the guarantor is trusted by said client or calculates and stores a new data signature for the data chunk stored and then marks the new data signature as verified when the guarantor is not trusted by said client; and wherein a guarantor is determined to be trusted by a host system of a client of said deduplication system if the received client authentication information is equal in value to the stored client authentication information, and using the guarantor reduces said deduplication system's verification of client data signatures such that data signatures only need to be verified for a new client of previously stored data.

6. The computer program product of claim 5, wherein the guarantor is determined to be trusted by a client if the stored data signature for the located data chunk is marked as verified.

7. The computer program product of claim 5, wherein the guarantor is determined to be trusted by a client if the guarantor is included in a list of trusted guarantors for the client.

8. The method of claim 5, wherein the guarantor is determined not to be trusted by a client if:
the stored data signature for the located data chunk is not marked as verified,
the received client authentication information is not equal to the stored client authentication information of the stored data signature; and
the guarantor is not included in a list of trusted guarantors for the client.

\* \* \* \* \*